June 7, 1966  R. REGER  3,254,657
CAMPING DEVICE AND METHOD
Filed Dec. 5, 1963  4 Sheets-Sheet 1

INVENTOR.
RAYMOND REGER
BY
Lockwood, Woodard, Smith & Weikart
Attorneys

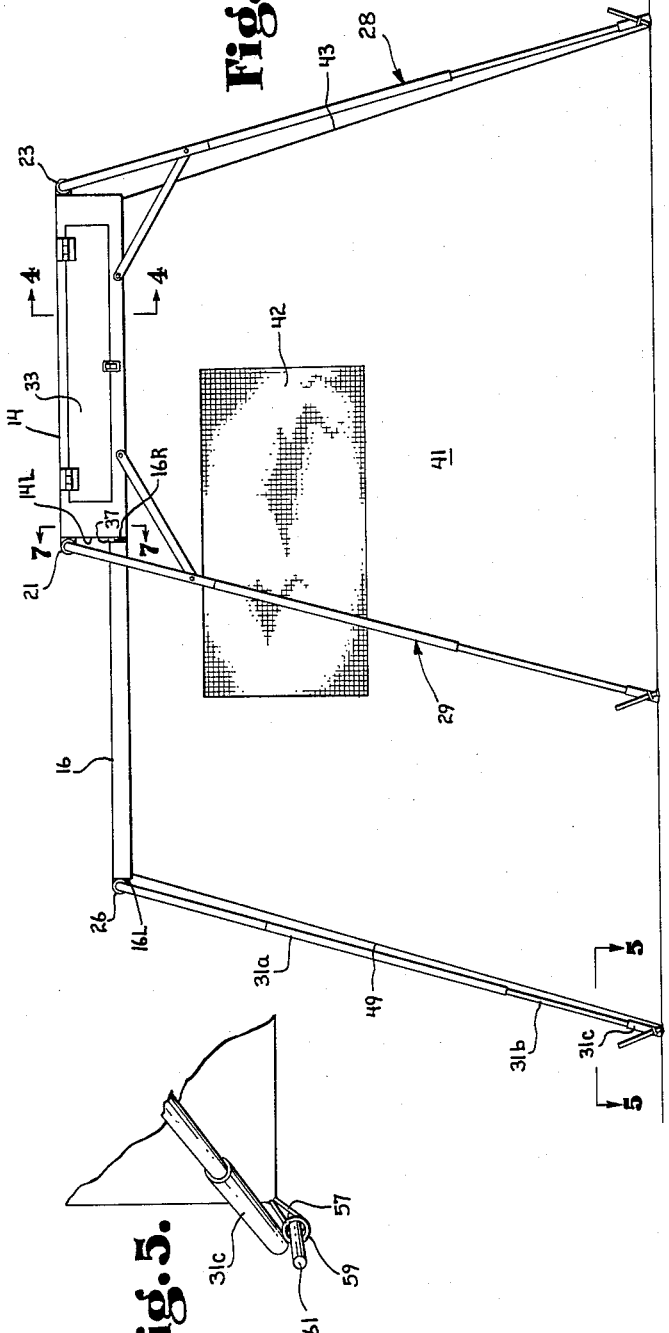
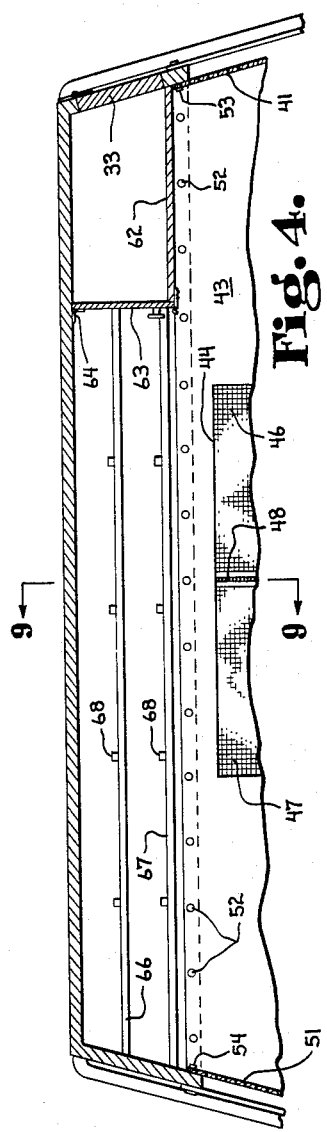
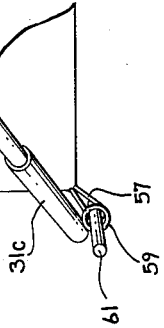
INVENTOR.
RAYMOND REGER

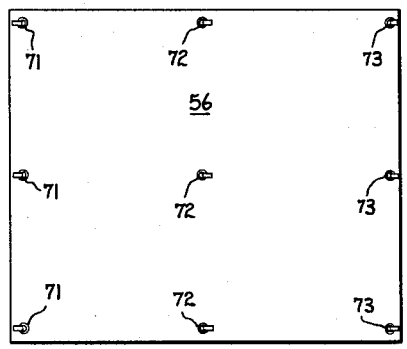
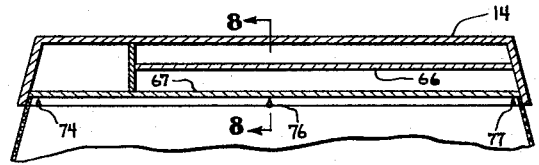
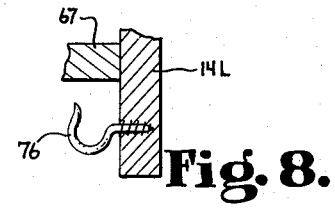
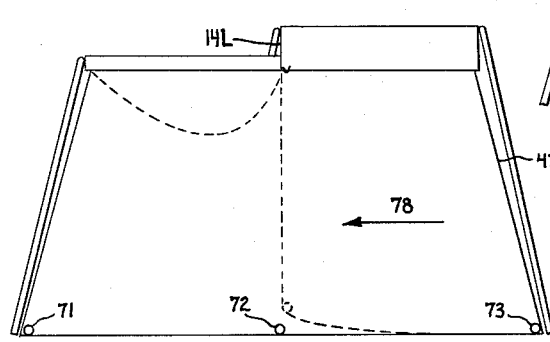
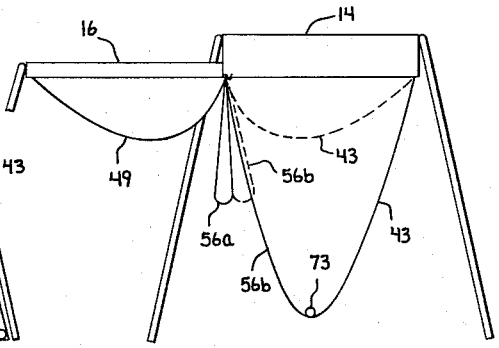
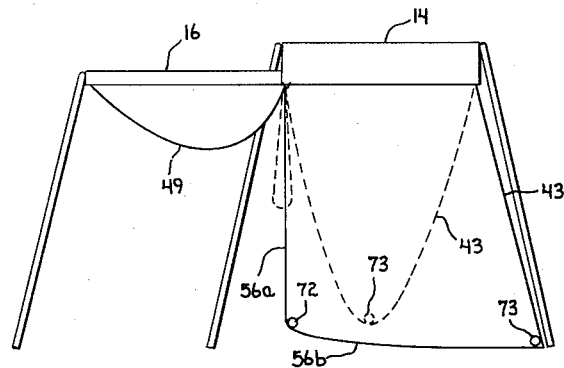
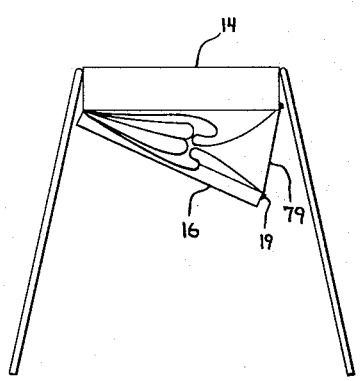
INVENTOR.
RAYMOND REGER

INVENTOR.
RAYMOND REGER

United States Patent Office 3,254,657
Patented June 7, 1966

3,254,657
CAMPING DEVICE AND METHOD
Raymond Reger, 240 Masten, Plainfield, Ind.
Filed Dec. 5, 1963, Ser. No. 328,271
10 Claims. (Cl. 135—1)

This invention relates generally to shelters and more particularly to a folding and portable shelter device of novel construction and which is well adapted for transportation on the roof of a passage vehicle, truck, or trailer.

Many types of portable shelters are well known. Those which are most common range from a pup tent to a house trailer. Naturally, the cost of portable shelters varies widely.

In recent years, many families have found that camping offers many advantages to them and enables them to take long and short vacations more frequently than would otherwise be possible. As the interest in camping has increased, considerable effort has been expended in making camping still more attractive by improving the equipment available for campers. Various devices have been provided for mounting to the top of a passenger vehicle and containing bedding so as to provide a place to sleep. These devices are of insufficient size to provide room for anything other than sleeping.

Improved tents have also been devised which facilitate the erecting and dismantling thereof. Yet, even when folded, the new tents of acceptable size for camping purposes occupy considerable space and may be difficult to handle.

There are also passenger vehicles designed for conversion into a temporary stationary shelter of acceptable size. However, when so converted, the vehicle is no longer available for transportation. This makes it necessary to fold up the various appendages for such vehicles and store them in the vehicle if it is to be used for short trips in the vicinity of the camp site or for longer strips.

It is, therefore, a general object of the present invention to provide an improved portable shelter.

A further object is to provide a portable shelter which is compact and can be conveniently carried on the roof of a passenger vehicle, and yet is readily erected to provide a shelter independent of the vehicle.

A further object is to provide a device having the foregoing characteristics and further characterized by ample interior space, ease of erection, and ease of returning to condition for transportation thereof.

Described briefly, a typical embodiment of the present invention includes an upper and lower housing, the lower housing being hinged to the upper housing and normally disposed below the upper housing when the unit is being transported. The unit is normally carried on the roof of a passenger vehicle by means of conventional roof carrying racks.

An integral wall and floor unit is secured to the upper and lower housings and disposed inside the housings. There is ample space remaining for the storage of air mattresses and other camping equipment. The upper and lower housings have brackets thereon to receive support legs which are normally carried on the sides of the upper housing when the unit is being transported.

For erection of the unit into a shelter, the support legs are mounted in the brackets of the upper housing and swung downwardly to an extent such that the upper housing is raised from the roof of the vehicle. It is then supported on these legs which are staked to the ground. The vehicle is driven out from under the unit and the lower housing is then swung downwardly and outwardly on a horizontal hinge into a substantially parallel relationship to the upper housing and at one side thereof. The wall and floor structure thereupon descends from the upper and lower housing units and the housing units form the roof while the wall and floor structure forms the walls and floor of the shelter. Means are provided in the upper housing and in the wall and floor structure facilitating the folding of the unit after use, as will become apparent.

The full nature of the invention will be understood from the accompanying drawings and the following description and claims.

FIG. 3 is a rear elevational view of the device completely erected and providing a shelter.

FIG. 4 is an enlarged fragmentary section taken along the line 4—4 in FIG. 3 and viewed in the direction of the arrows.

FIG. 5 is an enlarged detail taken along the line 5—5 in FIG. 3 and viewed in the direction of the arrows.

FIG. 6 is a miniature interior view of the floor of the structure as it appears when erected, this being a plan view.

FIG. 7 is a sectional view taken along the line 7—7 in FIG. 3 and viewed in the direction of the arrows.

FIG. 8 is an enlarged fragmentary sectional view taken along the line 8—8 in FIG. 7 and viewed in the direction of the arrows.

FIG. 9 is a miniature schematic sectional view through the center of the unit erected as shown in FIG. 3, the view being taken in the direction of the arrows 9—9 in FIG. 4 but omitting interior details of the housings. The dotted lines show the first stage for closing the unit.

FIG. 10 is a view similar to FIG. 9 showing the first stage in the return of the structure to the closed condition, and showing by dotted outlines the second stage.

FIG. 11 shows the second stage in the closing of the unit, and the third stage is shown by the dotted outline.

FIG. 12 shows the fourth stage in the closing of the unit.

Figure 1:
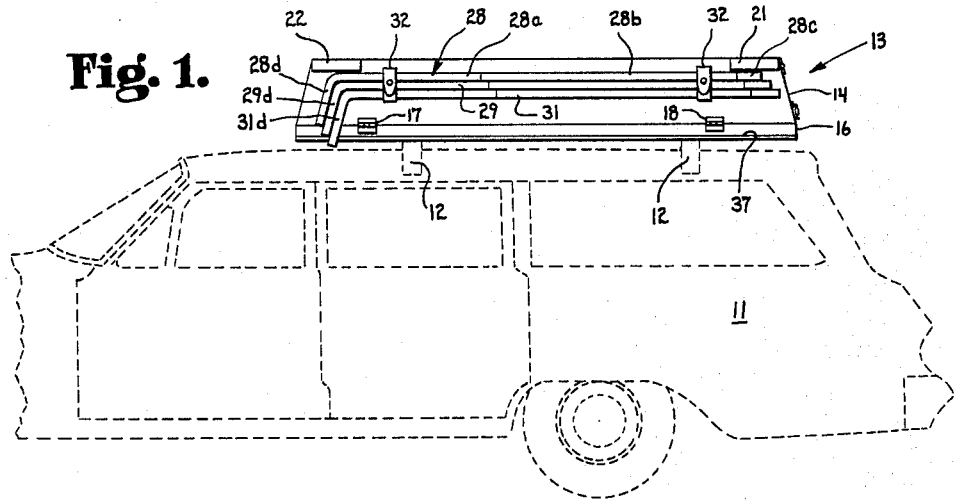
FIG. 1 is a left-hand side elevational view of a typical embodiment of the present invention mounted to the roof of a station wagon which is shown fragmentarily in the dotted outline.

Referring to the drawings in detail, the station wagon 11 has a standard luggage rack 12 on the roof thereof to which is mounted the unit 13. The unit 13 can be secured to the luggage rack by straps or clamps or any other suitable conventional means.

The clamping unit includes an upper housing 14 and a lower housing 16, the lower housing being hinged to the upper housing along the left-hand side margin at the hinges 17 and 18. Suitable over-center trunk latches 19 are employed at the right-hand side of the unit to secure the lower housing to the upper housing. The upper housing has four tubular brackets 21, 22, 23, and 24 (not shown). These brackets are secured to each of the four upper corners along the sides of the upper housing. Identical tubular brackets 26 and 27 (not shown) are provided at the right-hand marginal edge of the lower housing. Three generally L-shaped poles 28, 29 and 31 for legs are carried on each side of the upper housing, being secured thereto by the straps 32. A door 33 is provided in the rear end of the upper housing, being mounted by the hinges 34 and secured by the latch 36.

Each of the six legs provided may be of unitary rigid construction of a predetermined acceptable length. An alternative construction is to have each of the legs adjustable in length. This can be accomplished in any of several ways and in the illustrated example, referring to leg 28 specifically, there are three sections, the upper section 28a, the intermediate section 28b, and the foot section 28c. Section 28b is threadedly received in section 28a and is rotatably received in section 28c. There is an aperture through section 28b whereby a handle can be passed through it for turning this section relative to the upper and lower sections 28a and 28c, respectively, to change the length of the combination. The purpose of this will become immediately apparent.

When the vehicle has reached the camp site, the six legs are removed from the sides of the upper housing. The upper end portions of two of the legs are inserted into two of the brackets on one end of the upper housing. For example, the upper end portion 28d of leg 28 is inserted into the bracket 23. The upper end portion 29d of the leg 29 is inserted into the bracket 21. The two legs then hang on the brackets whereupon the length of the legs can be increased by unscrewing the center portions 28b and 29b therefrom. A handle such as 30 passed through an aperture in a central portion is convenient for this purpose. The legs can thereby be lengthened to lift the rear end of the unit to the extent desired. Thereupon the brace 35 can be connected from the pin 35a on the upper portion of the leg to the pin 35b in the upper housing. Brace 40 can be secured in like manner. Then two identical legs are mounted to the front end brackets 22 and 24 in the same manner whereupon the front end of the unit can be lifted by unscrewing the center sections of the legs. Braces such as 35 and 40 can then be attached to the front legs and the automobile can be driven out from under the unit.

At this point, it will readily be recognized that other types of extendable support legs can also be used and they could even be power operated if desired. The device is also well adapted to erection and support by novel means and method which will now be described.

Figure 13:
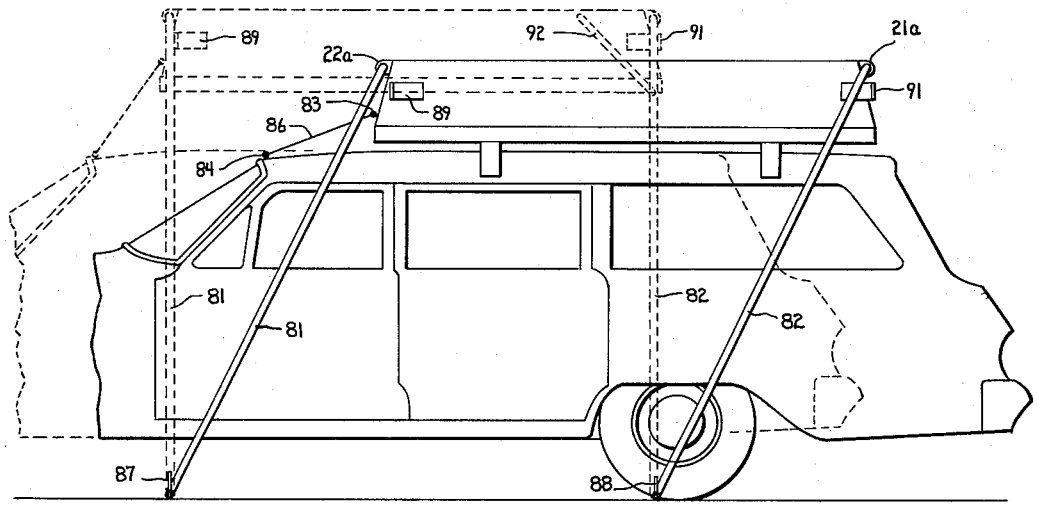
FIG. 13 illustrates one way of setting up the unit.

In FIG. 13, the device is identical to the devices illustrated in the previous figures in most respects. However, the tubular mounting brackets are mounted on the end walls of the housing adjacent the sides thereof rather than on the side walls adjacent the ends thereof. They are given the reference numerals 21a, 22a, and 23a and 24a, the latter two not being apparent in FIG. 13 of the drawings.

The four legs mounted to the four brackets are shaped like those of the previous figures. However, they are one-piece tubular units of fixed length. As shown by the two legs 81 and 82 appearing in FIG. 13, the legs are of a length greater than the vertical distance from the ground to the tubular brackets of the device when it is mounted on the vehicle. A hook 83 is mounted on the front of the upper housing, and a hook 84 is secured to the roof of the vehicle in front of the housing. A cable 86 is connected between hooks 83 and 84. If desired, the lower ends of the legs can be staked to the ground by stakes such as 87 and 88 in a manner such as shown in FIG. 5.

To raise the unit, the car is merely moved forward to the position shown by the dotted outline. This moves the unit to the position shown by the dotted outlines, the legs pivoting in the brackets and raising the unit from the roof carrier of the vehicle. The legs reach stops, such as 89 and 91, and braces such as 92 can then be secured in place. The cable 86 can then be disconnected, whereupon the vehicle can be driven out from under the unit.

Figure 2:
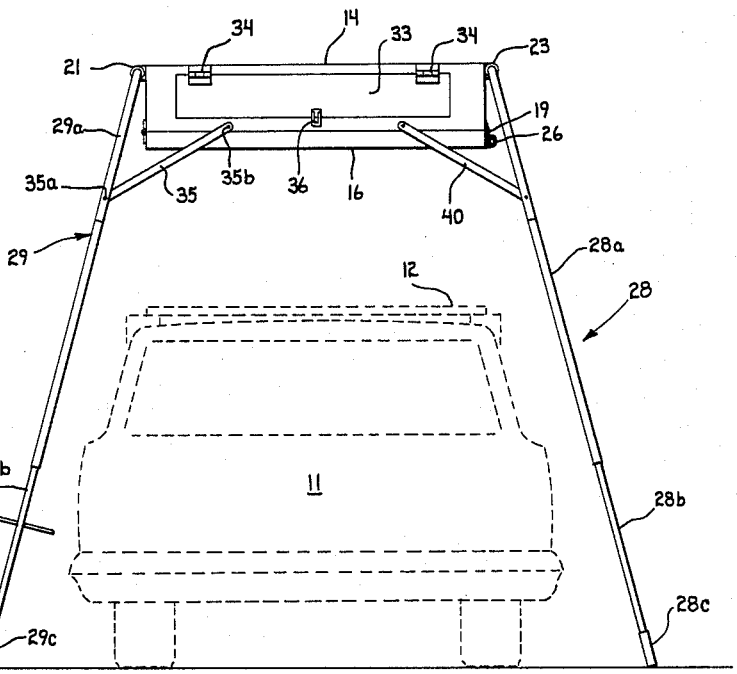
FIG. 2 is a rear end elevation of the device supported by the primary support legs, it being supported above the roof of the station wagon allowing the station wagon to be driven away.
Figure 14:
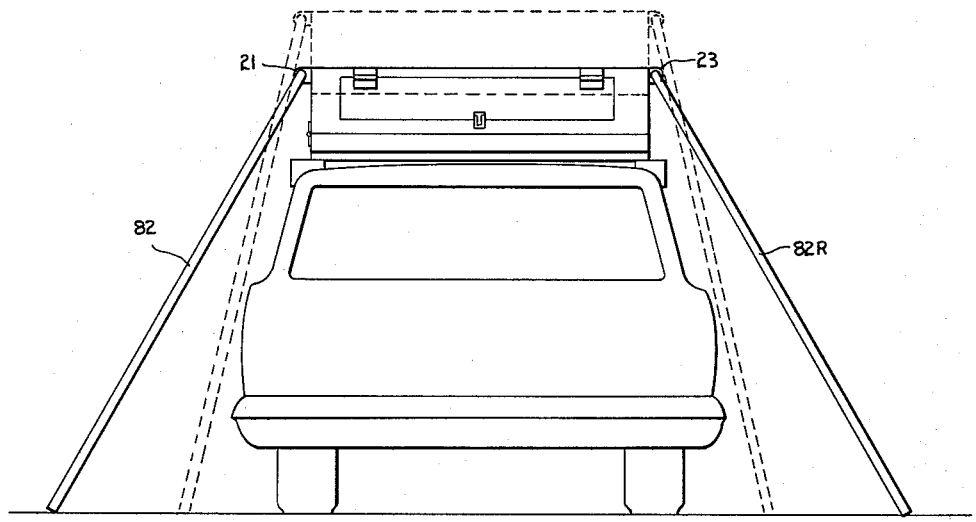
FIG. 14 illustrates a variation in the manner of setting up the unit.

Because the device can be made vrey light in weight, the rigid legs of FIG. 13 can be used in a very direct manner to raise the unit, regardless of whether the tubular brackets are on front or side walls of the housing. For example, as shown in FIG. 14, legs 82 and 82R are mounted to brackets 21 and 23 at the rear of the upper housing. A person can simultaneously lift and swing leg 82 to place it in a more vertical position nearer the vehicle. He can then lift and swing leg 82R to a more vertical position nearer the vehicle. Braces such as 35 and 40 of FIG. 2 are installed. The movement of the legs in this manner raises the rear end of the unit to the position shown by the dotted outline in FIG. 14. The front end is raised in the same way and the car is driven from under the unit.

Upon driving the car out from under the housings, the latches 19 can be released and the housing 16 is swung downwardly and outwardly on the hinges 17 and 18 to the position shown in FIG. 3. Thereupon the remaining two legs are mounted in the brackets 26 and 27 (not shown) secured to the outer edge thereof. For example, the offset upper end 31d of leg 31 is mounted in the bracket 26. The central section 31b is turned with respect to section 31a to provide a proper length so that the foot section 31c properly engages the ground. The sixth leg is mounted to the other bracket of the lower housing 16 in the same manner. If four legs of fixed length have been used as described above, the other two legs can be of fixed length.

An elongated sealing strip of rubber or other suitable material 37 is mounted on the side 16R of the lower housing 16 which is juxtaposed with the side 14L of the upper housing. This sealing strip engages the side 14L of the upper housing when the lower housing is moved to the position shown in FIG. 3. It therefore prevents leakage at the joint of the two housings. Consequently, the two housings then form a waterproof roof for the shelter.

It will be helpful in considering the rest of the description to understand that when the expression left hand is being used it refers to that which appears to be on the left hand when the device is viewed as shown in FIG. 3. In FIG. 3, the left hand side of the upper housing is the side 14L. The right hand side of the lower housing is the side 16R.

The walls and floor of the unit are typically made of a flexible material such as canvas or other suitable tent material. The rear wall 41 has a window 42 therein and the other walls may also have windows therein if desired. The right hand wall 43 has a doorway 44 therein which may include the screens 46 and 47 with a suitable zipper 48 for securing the doorway closed when desired. The left hand wall 49 and the front wall 51 may or may not have doors and windows therein, depending on the desires of the campers. Each of the walls has its upper marginal edge secured to some portion of one or the other of the housings, at the interior thereof. For example, as shown in FIG. 4, the wall 43 has its upper marginal edge secured to the inner wall of the right hand side of the upper housing by means of the snap fasteners 52. Part of the rear wall 41 is secured to the inner and lower marginal edge of the upper housing by means of the snap fasteners 53. The remainder of the upper edge of the rear wall 41 is secured to the inside of the rear wall of the lower housing 16. A portion of the upper marginal edge of the front wall 51 is secured to the inside face of the front wall of the upper housing by means of the snap fasteners 54. The remainder of the upper marginal edge portion of the front wall 51 is secured to the inside face of the front wall of the lower housing 16. The left hand wall 49 is secured along its upper marginal edge to the inside face of the wall of the lower housing which wall is identified 16L. This is the wall of housing portion 16 to which the brackets 26 and 27 are mounted on the outside face. Consequently the walls of the shelter are suspended from the two housings. The floor 56 of the shelter is sewn to the lower marginal edges of the walls thereof. Suitable loops such as loop 57 may be provided at various points along the junction of the floor and walls of the structure to receive stakes to properly stretch the floor and retain it without wrinkles. As further shown in FIG. 5 an eye 59 is provided in the lower or foot section of each of the legs. This eye is for the purpose of receiving an anchor stake 61 and avoids any necessity of driving the legs into the ground. The same stake can be used also for the various loops such as loop 57. Additional stakes may be provided along the sides of the walls if desired to further secure the walls and floor. A stake is provided at each of the support legs.

As shown best in FIG. 4, a permanent shelf 62 is provided adjacent the rear wall of the upper housing and between the left hand and right hand side walls of the housing. This shelf is accessible at all times from the exterior of the unit by means of the door 33. It is accessible from the interior of the shelter when the shelter is erected by means of the door 63 pivotally mounted to the roof of the upper housing by the hinges 64. Permanent shelves 66 and 67 may be provided on the inside of each of the side walls of the upper housing. These need not extend completely across the housing and preferably do not. By being of limited extent, they are easily accessible from the inside of the shelter when erected and yet facilitate the installation and support of air mattresses across the unit when the unit is not being used. Snap fastener 68 on the upper surfaces of these shelves facilitate the attachment of straps thereto from a shelf on one side of the housing to a shelf on the other side of the housing to support air mattresses therebetween. Temporary shelves may be slung below the permanent shelves when the structure is erected, if desired, to provide additional shelf space when the unit is being used as a shelter. Such temporary shelves can be stored on the permanent shelves when the unit is again closed for transportation.

By having the permanent shelf 62 accessible both from the interior and exterior of the housing, it can be used for the storage of tools such as a hammer or screw driver for facilitating the erection of the unit. It can also be used for storage of legs in units where the legs are made to telescope to a sufficiently short length.

As shown in FIG. 6, the floor 56 is provided with 9 rings in three groups. The rings 71 may be considered belonging to the first group, the rings 72 belonging to the second group, and the rings 73 belonging to the third group. Each of these rings is secured to the floor of the shelter by a suitable loop sewn to the floor or by other means. Also shown in FIG. 7, there are three hooks 74, 76, and 77. These hooks are mounted to the inside face of the left hand wall 14L or side of the upper housing adjacent the lower marginal edge thereof. The hooks may be conventional hooks much like that shown in FIG. 8. These hooks and rings make the reversion of the shelter into the transportable unit, a matter of manifest simplicity.

Referring to FIGS. 9 and 10, in order to close up the unit, after releasing the anchor loops from the stakes at the exterior of the shelter, a person may first walk into the tent through the doorway in the wall 43, walking in the direction of the arrow 78. The person then picks up each of the loops 71 and places one loop on each of the three hooks 74, 76 and 77. This raises the left hand wall of the structure to a position designated generally by the reference numeral 49 in FIG. 10. A portion 56a of the floor 56 is also picked up whereas the remainder of the floor remains approximately as indicated by reference numeral 56b. The person then steps out of the shelter and, reaching in through the doorway, he picks up the rings 72. If necessary in order to easily reach the rings 72 from outside the shelter, he may move the wall 43 and floor portion 56b adjacent thereto, by kicking or otherwise toward rings 72 so that they are within easy reach from outside the shelter, or he may reach in and gather the floor material toward him to bring the rings 72 within easy reach from outside the shelter. He hooks each of rings 72 on one of the hooks 74, 76 and 77. This folds the portion 56a of the floor into the character shown in FIG. 11 while the portion 56b thereof hangs from the rings 72. The person then merely reaches through the door, standing outside of the shelter, and picks up each of the rings 73 and hooks them to one of the hooks 74, 76 and 77. This places the portion 56b in the position designated by the dotted outline in FIG. 11 and places the right hand wall 43 in the position designated by the dotted outline in FIG. 11.

The support poles which are holding up the outer side of the lower housing 16 are then removed whereupon the housing 16 is swung to the position shown in FIG. 12. In this position it is held up by the rope 79 which is secured to the upper housing and temporarily hooked to one of the latches of the lower housing. At this time, with the lower housing supported in this condition, the portions of the walls of the shelter which may be hanging outside of the margins of the lower housing can be properly tucked into place to facilitate closing of the housing the remaining distance. Once these portions are tucked in, the rope 79 may be removed or disconnected and the lower housing may be closed against the upper housing and secured by the latches 19.

After this is done, the automobile may be driven into position under the housing. Then the legs may be operated to lower the unit onto the roof rack of the car. Then the legs are removed and stored either on the outside of the unit as shown in FIG. 1 or inside the unit by means of the rear door 33.

From the foregoing description, it will be apparent that the present invention achieves all of the objects set out herein. It is adapted to use of a wide variety of materials. While it can be constructed quite simply and inexpensively it also lends itself readily to the incorporation of many deluxe features. Even if made of very heavy construction and if used to store a lot of heavy equipment, the device can be readily erected by the use of extendible poles such as described herein and this can be done by one person.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A portable shelter comprising: first and second rigid roof members supported by legs and hinged to each other along marginal edges of each; a flexible material hanging from marginal portions of each of said roof members to provide walls of a shelter; a flexible floor secured around lower margins of said flexible material to provide a floor integral therewith; loops mounted at predetermined locations on top of said floor inside the shelter; hooks mounted in one of said roof members adjacent an interior marginal portion thereof and receiving the loops to secure discrete portions of said floor to said hooks and facilitate folding of said shelter.

2. A method of folding a portable shelter comprising the steps of: entering the shelter and bringing a portion of the interior thereof toward the point of entry thereof and securing said portion at a predetermined location; emerging from the shelter; reaching into the shelter and moving additional portions thereof into said predetermined location and securing the adidtional portions at said location; reaching into said shelter and moving third portions thereof to said predetermined location and securing said third portions at said predetermined location; picking up suspended portions of the shelter from the exterior thereof and holding in a predetermined position; folding other suspended portions into position above the held portions; and moving all of said portions into a space adjacent said predetermined location.

3. A portable camping shelter device comprising: a first downwardly opening rigid housing having front and rear walls and left and right side walls and a roof meeting said walls, said first housing being disposed in a first position above the ground; a second downwardly opening rigid housing having front and rear walls and left and right side walls and a roof meeting said walls, said second housing being disposed in a second position above the ground with the left wall of said first housing being juxtaposed with the right wall of said second housing; ground engaging legs connected to said housings and supporting said housings in said positions above the ground; means pivotally mounting said housings together, at least one of said legs being removable from position supporting said second housing whereby said second housing is swingable to a third position under said first housing where the openings of said housings meet to form a closed container while said first housing remains stably supported in said first position by some of said legs other than said one leg; bridging means at the juxtaposed walls to prevent passage of liquid therebetween to an area below said housing, whereby said housings and bridging means provide a roof; and flexible wall-forming material secured to inside faces of said walls of said housings and extending hanging downwardly therefrom and forming an enclosure covered by said roof to form a shelter.

4. The device of claim 3 wherein said housings, when forming a closed container, enclose all of said wall forming material.

5. The device of claim 3 wherein said wall forming material is removably secured to said faces by snap fasteners.

6. The device of claim 3 further comprising: a door in one wall of said walls of said first housing other than said left wall; and a shelf in said housing adjacent to said door and accessible through said door, said shelf being accessible from below said first housing.

7. The device of claim 3 wherein: brackets are mounted to walls of said first housing and to a wall of said second housing, and said legs have first and second angularly offset portions in one rigid piece with the first portions received in and supporting said brackets.

8. A portable camping shelter device comprising:
a first downwardly opening rigid housing having front and rear walls and left and right side walls and a roof meeting said walls;
a second downwardly opening rigid housing having front and rear walls and left and right side walls and a roof meeting said walls, the left wall of said first housing being juxtaposed with the right wall of said second housing;
ground engaging legs connected to said housings and supporting said housings above the ground;
means pivotally mounting said housings together whereby said second housing is swingable to position under said first housing where the openings of said housings meet to form a closed container;
bridging means at the juxtaposed walls to prevent passage of liquid therebetween to an area below said housing, whereby said housings and bridging means provide a roof;
flexible wall-forming material secured to inside faces of said walls of said housings and extending downwardly therefrom and forming an enclosure covered by said roof to form a shelter;
flexible floor forming material secured to said wall-forming material adjacent lower marginal portions of said wall-forming material, said floor forming material having a plurality of loops attached to the upper surface thereof;
and fastener means in one of said housings and connected to said loops, said fastener means thereby cooperating with said wall-forming material to support said floor forming material during transition of said device between portable condition and shelter forming condition.

9. A portable camping shelter device comprising:
a first downwardly opening rigid housing disposed in a first position above the ground;
a second downwardly opening housing disposed in a second position above the ground, said housings providing a roof for the shelter;
ground engaging legs connected to said housings and supporting said housings in said positions above the ground;
means pivotally mounting said housings together whereby said second housing is swingable to a third, upwardly-opening position directly under said first housing while said first housing remains supported in said first position, to form a closed container;
flexible, wall-forming material secured to inside surfaces of said housings and hanging downwardly therefrom and forming a four-walled enclosure covered by said roof to form a shelter when said first and second housings are in said first and second positions, respectively;
flexible floor-forming material secured to said wall-forming material adjacent lower marginal portions of said wall-forming material, said floor forming material having a plurality of loops attached to the upper surface thereof;
and fastener means in one of said housings and connected to said loops and cooperating with said wall forming material to support said floor forming material during transition of said device between the portable closed-container condition and the shelter forming condition.

10. A portable camping shelter device comprising:
a first downwardly opening rigid housing disposed in a first position above the ground;
a second downwardly opening housing disposed in a second position above the ground, said housings providing a roof for the shelter;
ground engaging legs connected to said housings and supporting said housings in said positions above the ground;
means pivotally mounting said housings together whereby said second housing is swingable to a third, upwardly opening position directly under said first housing while said first housing remains supported in said first position, to form a closed container;
flexible, wall-forming material secured to inside surfaces of said housings and hanging downwardly therefrom and forming a four-walled enclosure covered by said roof to form a shelter when said first and second housings are in said first and second positions, respectively;
and retainer means connected to said first and second housings and supporting said second housing in an upwardly opening fourth position intermediate said second and third positions thereof during transition of the shelter device between the shelter forming condition and the portable closed-container condition to facilitate folding and placement of said wall-forming material in said second housing prior to movement of said second housing from said fourth position to said third position, to facilitate closing of the second housing to said third position to complete the closed container.

References Cited by the Examiner

UNITED STATES PATENTS

| | | | |
|---|---|---|---|
| 1,527,908 | 2/1925 | Noble | 135—1 |
| 1,752,571 | 4/1930 | Olson | 135—4 |
| 1,774,909 | 9/1930 | Wells | 135—16 |
| 2,222,636 | 11/1940 | Strauss | 135—1 |
| 2,826,210 | 3/1958 | Heil | 135—4 |
| 2,837,777 | 6/1958 | White | 20—2 |
| 3,010,462 | 11/1961 | Barber | 135—1 |
| 3,111,955 | 11/1963 | Green | 135—1 |

HARRISON R. MOSELEY, *Primary Examiner.*

REINALDO P. MACHADO, *Examiner.*

L. J. SANTISI, *Assistant Examiner.*